United States Patent [19]
Butler et al.

[11] Patent Number: 5,813,631
[45] Date of Patent: Sep. 29, 1998

[54] PNEUMATIC DEICING SYSTEM WITH DRAIN VALVE

[75] Inventors: Donald E. Butler; Richard L. Rauckhorst, III, both of North Canton; Thomas A. Waples, Mogadore; Alan J. Fahrner, Canton, all of Ohio

[73] Assignee: The B. F. Goodrich Company, Richfield, Ohio

[21] Appl. No.: 804,774

[22] Filed: Feb. 24, 1997

[51] Int. Cl.$^6$ ........................................... B64D 15/18
[52] U.S. Cl. ................................ 244/134 A; 244/134 E; 220/339; 215/237
[58] Field of Search ........................ 244/134 R, 134 A, 244/134 E, 119; 220/339; 215/235, 237

[56] References Cited

U.S. PATENT DOCUMENTS

| | | | |
|---|---|---|---|
| 2,476,198 | 3/1949 | Lawrence . | |
| 3,690,601 | 9/1972 | Roemke | 244/134 A |
| 4,508,143 | 4/1985 | Ogasawara . | |
| 4,922,947 | 5/1990 | Champseix . | |
| 5,275,362 | 1/1994 | Weisend, Jr. et al. | 244/134 A |
| 5,393,014 | 2/1995 | Weisand, Jr. et al. | 244/134 A |
| 5,398,890 | 3/1995 | Weisand, Jr. et al. | 244/134 A |
| 5,489,073 | 2/1996 | Leffel et al. | 244/134 R |
| 5,577,688 | 11/1996 | Sloan | 244/119 X |

FOREIGN PATENT DOCUMENTS

0595244 A  4/1994  European Pat. Off. .

*Primary Examiner*—William Grant
*Attorney, Agent, or Firm*—Richard A. Romanchik

[57] ABSTRACT

A pneumatic deicing system includes a deicer assembly comprised of an outer layer, an inner ply, and a plurality of inflatable members provided therebetween. The deicer assembly is disposed directly on top of and bonded to an airfoil. The deicer assembly is inflated through an inflation port. Fluid is drained from the deicer assembly through a drain valve.

8 Claims, 7 Drawing Sheets

PNEUMATIC DEICING SYSTEM WITH DRAIN VALVE

This application claims the benefit of U.S. provisional application Ser. No. 60/012,314, filed Feb. 26, 1996.

FIELD OF THE INVENTION

The present invention relates to deicing systems and more particularly, a pneumatic deicing system having a drain port for purging water therefrom.

BACKGROUND OF THE INVENTION

Under certain operating conditions aircraft are vulnerable to accumulation of ice on component surfaces. It is well known that such accumulation of ice can lead to disastrous results. A wide variety of systems have been developed for removing ice from aircraft during flight and can be placed into three general categories: thermal, chemical, and mechanical.

The mechanical category of deicing systems operate by distorting the airfoil surface of the aircraft to be deiced. Distortion of the airfoil surface causes cracking in the ice accumulated thereon, and subsequent dispersal of that ice into the air stream passing over the aircraft component.

The principal commercial mechanical deicing means is commonly referred to as pneumatic deicing wherein a component (e.g. the leading edge of a wing) of an aircraft is covered with a plurality of expandable, generally tube-like structures inflatable by employing a pressurized fluid, typically air. Upon inflation, the tubular structures tend to substantially expand the leading edge profile of the wing or strut and crack ice accumulating thereon for dispersal into the air stream passing over the aircraft component. Typically, such tube-like structures have been configured to substantially extend parallel to the leading edge of the aircraft component.

A known problem which reduces the product life of pneumatic deicers is the accumulation of water therein from moisture in the pressurized air source. Heretofore, accumulated water has no way to escape from the deicer.

Efforts to improve such systems have led to continuing developments to improve their versatility, practicality and efficiency.

DISCLOSURE OF THE INVENTION

According to the present invention, a pneumatic deicing system includes an inflatable deicer comprised of at least one inflatable member;

an input port for providing access to said inflatable member for inflation thereof; and, a drain valve for providing access to said inflatable member for draining fluids from said inflatable member.

The present invention increases the reliability and product life of pneumatic deicers while utilizing much of the same technology. In addition, the present invention is inexpensive and does not significantly alter the profile of existing systems.

These and other objects, features, and advantages of the present invention will become more apparent in light of the detailed description of exemplary embodiments thereof, as illustrated by the drawings.

BRIEF DESCRIPTION OF THE DRAWINGS

FIG. 6b is a cross-sectional view of a drain valve in accordance with the drain valve of FIG. 6a.

FIG. 7b is a cross-sectional view of a drain valve in accordance with the drain valve of FIG. 7a.

BEST MODE FOR CARRYING OUT THE INVENTION

The present invention provides an apparatus for deicing a leading edge surface. By "deicing" what is meant is the removal of ice subsequent to formation of the ice upon the leading edge. By "leading edge" what is meant is that portion of a surface of a structure which functions to meet and in substantial measure break an air stream impinging thereon. Examples of leading edges would be forward edge portions of wings, stabilizers, struts, nacelles, propellers, rotating wings, tail rotors, and other housings, objects and protrusions first impacted by an air stream flowing over an aircraft in flight as well as spars, struts and other structural elements.

Figure 1:
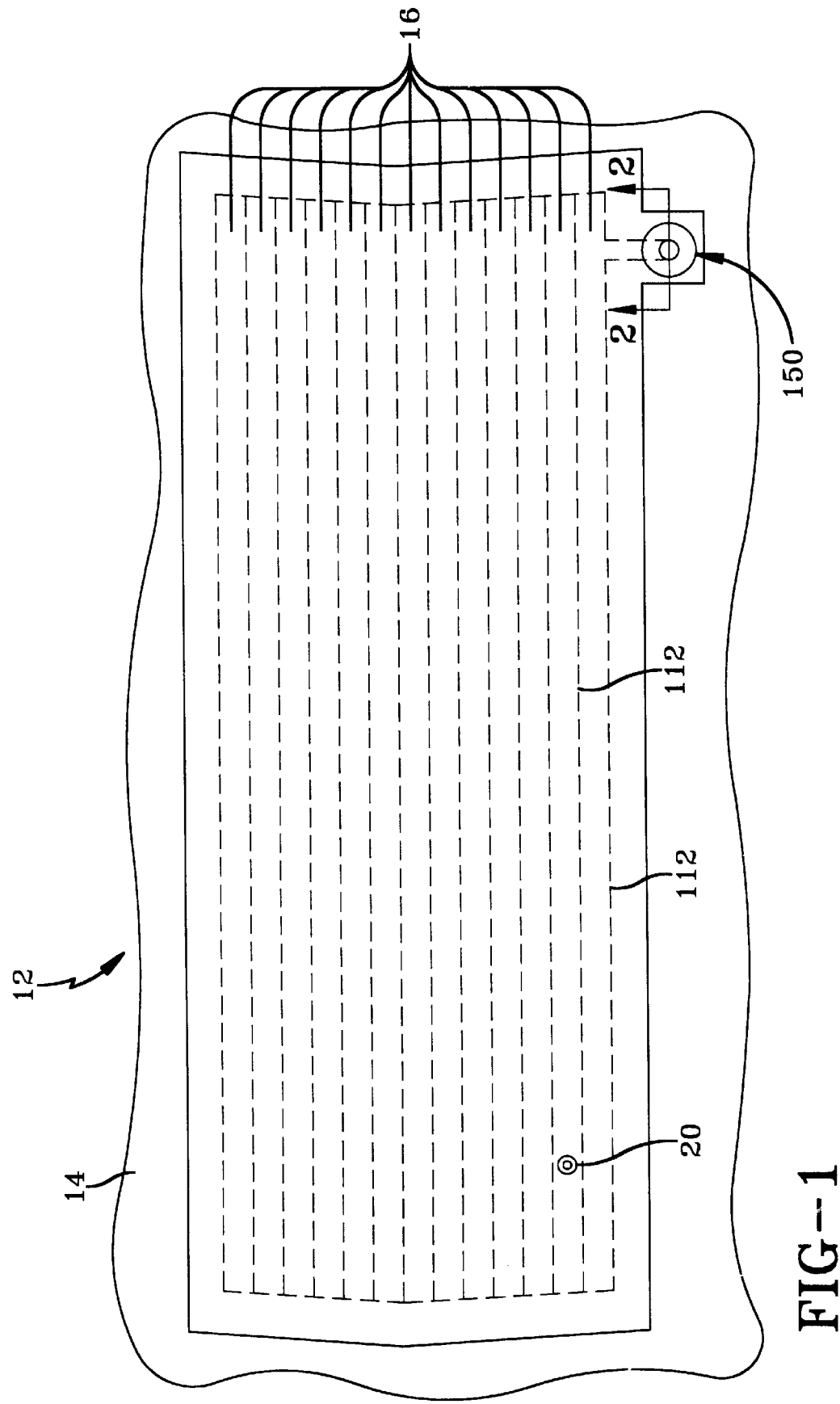
FIG. 1 is a top view of a pneumatic deicing system in accordance with the present invention.

FIG. 1 illustrates a pneumatic deicer 12 in accordance with the present invention formed from a composite having rubbery or substantially elastic properties. The deicer 12 is disposed on an airfoil 14 or other substrate. A plurality of inflatable members or tubes 16 are formed in the composite and are provided pressurized fluid, such as air, from a fluid via an inflation port or connector 20, which transfers fluid from a pressurized source (not shown). Connector 20 is integrated into the deicer 12 during manufacturing. Tubes 16 expand or stretch under pressure by 40% or more during inflation cycles, thereby causing a substantial change or distortion in the profile of the deicer (as well as the leading edge) to cause cracking of ice accumulating thereon. The times for inflating such tubes average between approximately 2 and 6 seconds.

A drain valve 150 is provided as an integral part of the deicer 12. During servicing of the aircraft, drain valve is opened and pressurized air is provided to the deicer 12 through connector 20. Water or other fluids that may have accumulated within the tubes 16 will thereby be purged from the system by migrating out through valve 150. The air pressure during this process is preferably higher than the air pressure provided during normal deicer operation. Elevated air temperature may also be used to facilitate the drying process.

Figure 2:
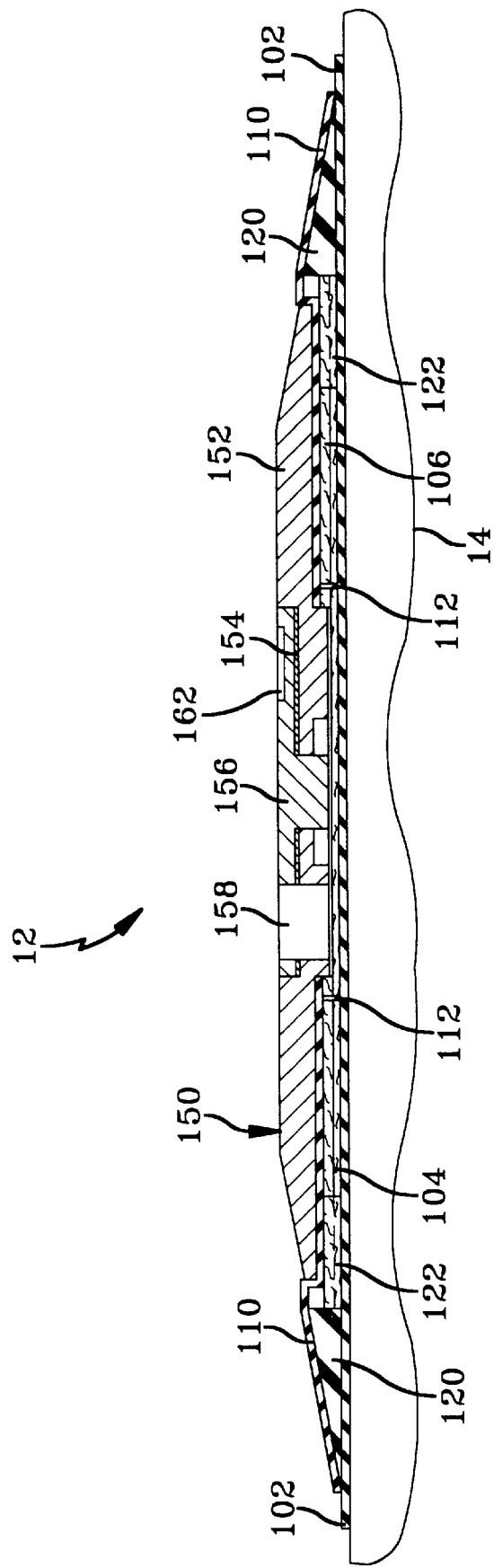
FIG. 2 is a cross-sectional view of the pneumatic deicing system of FIG. 1, taken along line 2—2.
Figure 3A:
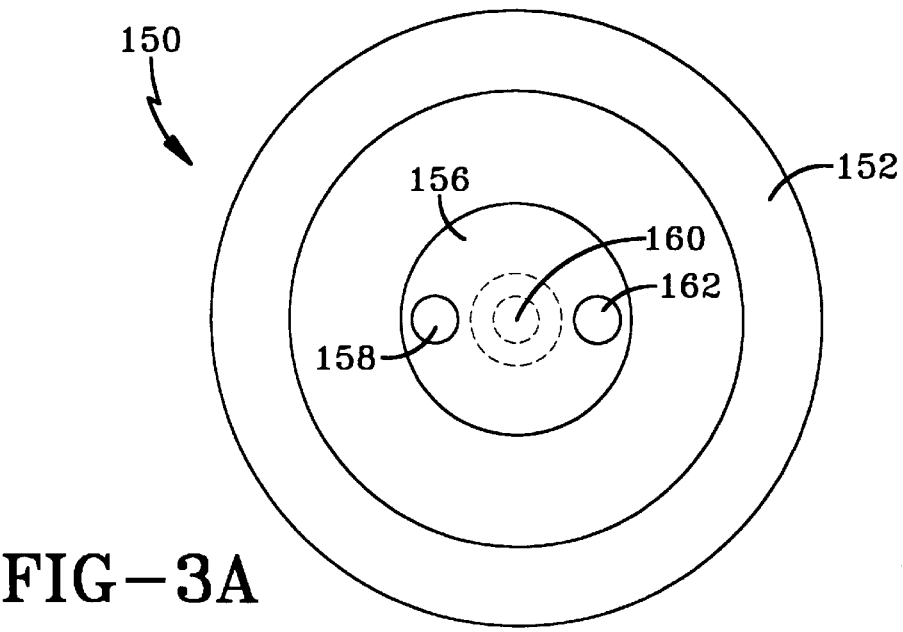
FIG. 3a is a top view of a drain valve for a pneumatic deicing system in accordance with the present invention.
Figure 3B:
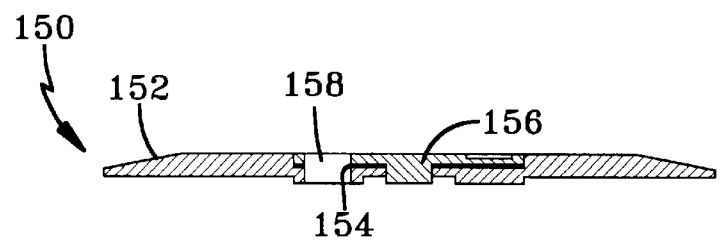
FIG. 3b is a cross-sectional view of a drain valve for a pneumatic deicing system in accordance with the present invention.
Figure 3C:
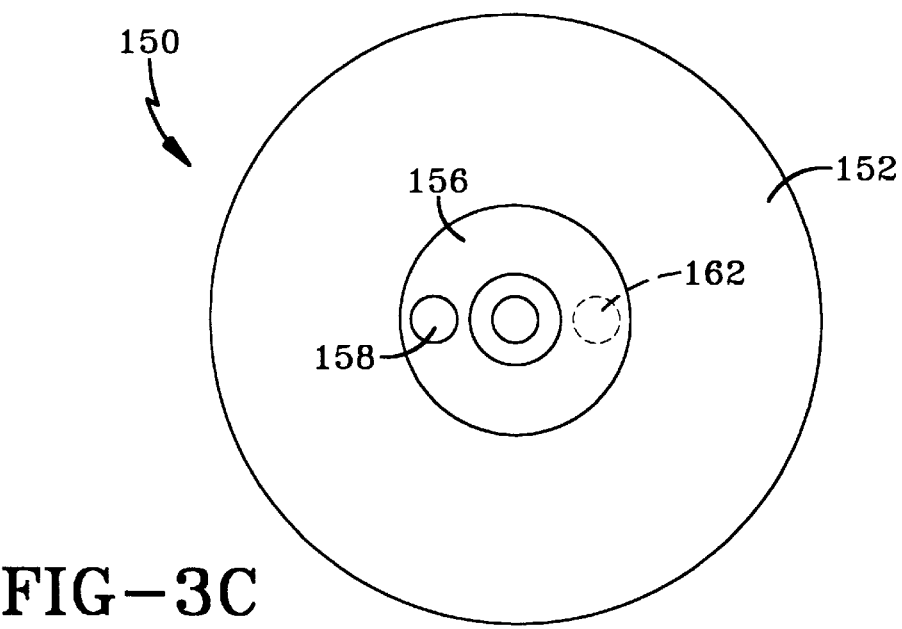
FIG. 3c is a bottom view of a drain valve for a pneumatic deicing system in accordance with the present invention.
Figure 4A:
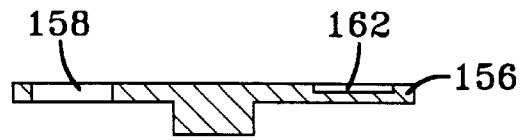
FIG. 4a is a cross-sectional view of the drain plug section of a drain valve in accordance with the present invention.
Figure 4B:
FIG. 4b is a cross-sectional view of the disc section of a drain valve in accordance with the present invention.
Figure 4C:
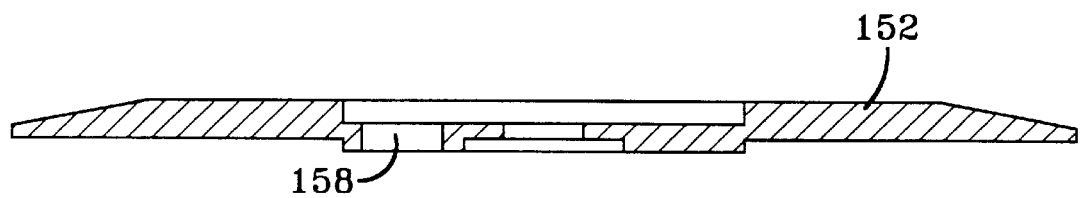
FIG. 4c is a cross-sectional view of the drain port section of a drain valve in accordance with the present invention.

Referring now to FIG. 2, the preferred construction for deicer assembly 12 of FIG. 1 is a composite, comprised from bottom (the side of material attached to the airfoil 14) to top of: a) a bottom rubber layer 102 on the order of 0.01–0.03 inch thick; b) a layer 104 on the order of 0.012 inch thick nonstretchable nylon fabric having rubber coating on one side; c) a layer 106 on the order of 0.020 inch thick stretchable nylon fabric having rubber coating on one side; and d) a top rubber layer 110 on the order of 0.010 inch thick. Rubber layers 102, 110 are preferably made from rubber or rubber-like material such as a plasticizing compound that may include fabric reinforcement, or other compound having a modulus of elasticity of less than 40,000 kPa. Suitable or conventional rubber or rubber-like materials are well known in the art, such as chloroprenes (such as NEOPRENE®, a registered trademark of E.I. DuPont denemours & Company), nitrile rubbers or polyurethanes. Tube-like members 16 are created by sewing the nylon layers 104, 106 together in the appropriate pattern. Thread lines 112 illustrate the forming of one tube-like member. The preferred material for thread 112 is nylon or KEVLAR® (a registered trademark of E.I. DuPont denemours & Company). Also for exemplary purposes, all lines in FIGS. 1 which are created by sewing thread (as shown in FIG. 2) in this manner are illustrated as thick dotted lines.

Additional rubber filler pieces 120 may be provided to for providing a smooth deicer contour. The outer edges of layers 104, 106 are bonded together to form integral areas 122. Likewise the outer edges of top layer 110 is bonded to bottom layer 102.

Drain valve 150 is bonded into deicer 12 and is comprised of a port or body 152 section, a sealing disc section 154 and a plug section 156. Port section 152 has a port 158 which extends through deicer layers 110, 106. Air and other fluids trapped between layers 104, 106 will escape from deicer assembly 12 when pressurized air is provided through connector 20 and valve 150 is opened. It is to be noted that although stitch lines 112 are effective in damming air to provide inflation tubes when the deicer is pressurized, they are still permeable enough to allow air and other fluids to migrate therethrough.

Valve 150 is opened and closed by rotating plug section 156 and disc section 154 with respect to port section 152 with an appropriate tool (not shown). Drain valve 150, when assembled, is preferably on the same order of thickness as the deicer assembly 12 so as not to protrude excessively. The preferred materials for port section 152 are aluminum or chloroprene. The preferred material for sealing disc section 154 is teflon. The preferred material for plug section 156 is stainless steel. The preferred bonding agent for bonding the valve 150 into the deicer assembly is part number SC2000 available from Rematech.

Referring now to FIGS. 3a–3c and FIGS. 4a–4c, sections 152, 154, 156 are swaged and press fitted together. Section 154 is rotated about a central axis 160 with respect to disc 154 and port section 152 in order to align a port hole 158 provided in each section to thereby provide a fluid conduit from outside the deicer to the area between the tube sections. A detent 162 in plug section 156 facilitates such rotation using an appropriate tool (not shown).

Figure 5:
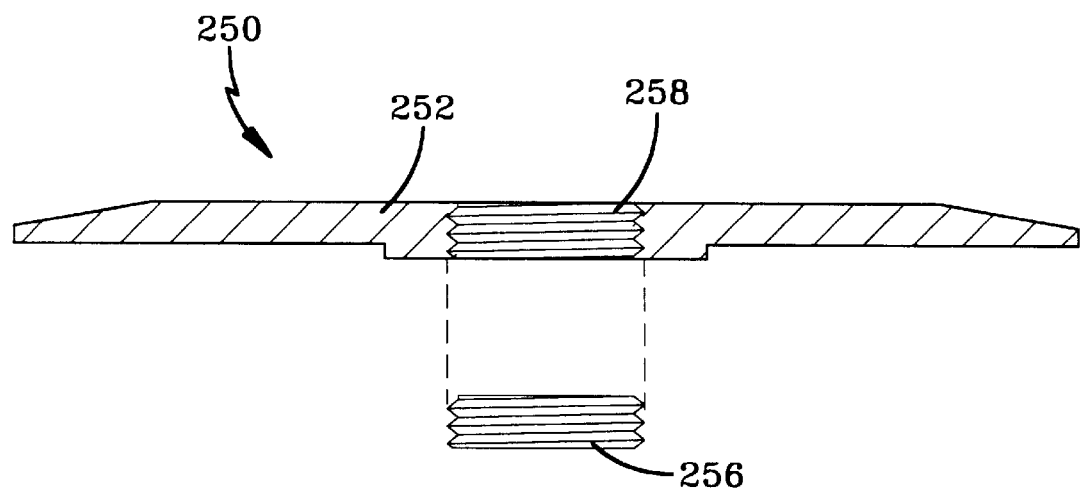
FIG. 5 is a cross-sectional view of a drain valve in accordance with an alternate embodiment of the present invention.

Referring now to FIG. 5, an alternate drain valve 250 is comprised of a drain port section 252 having a threaded drain port 258. A threaded drain plug 256 is mated with section 252 to close the valve and removed in order to purge the deicer of water and other fluids.

Figure 6A:
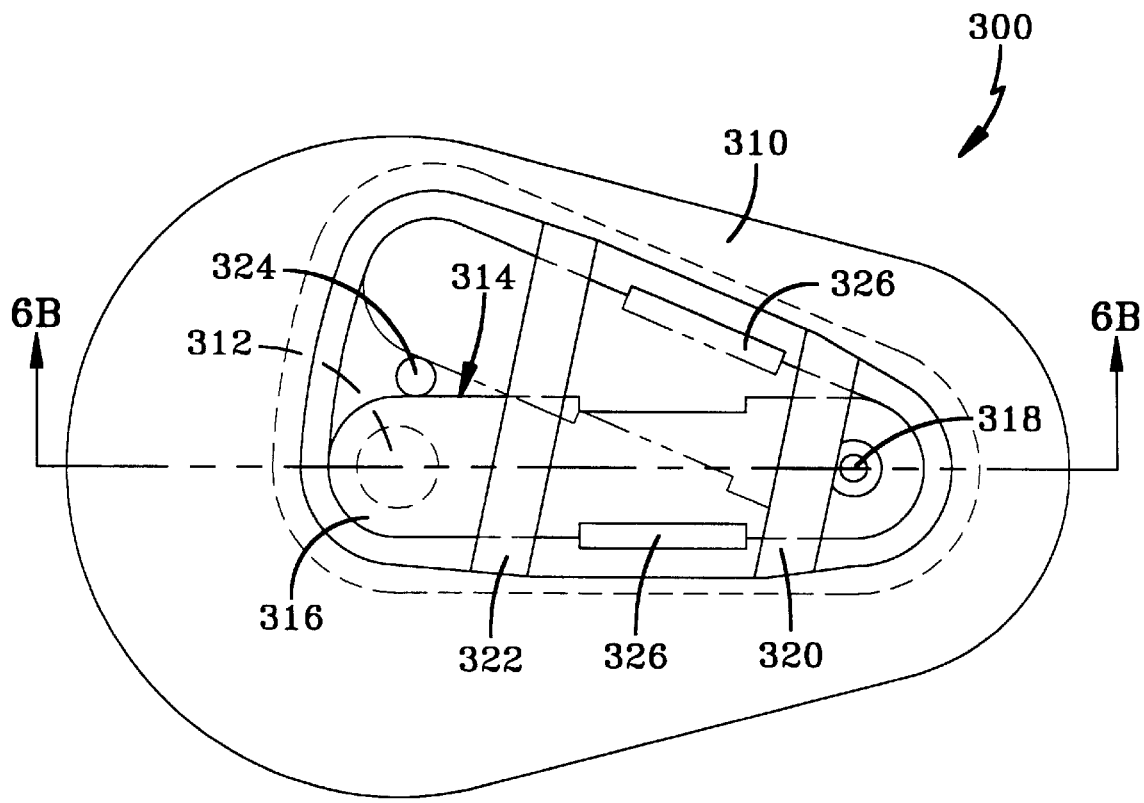
FIG. 6a is a top view of a drain valve in accordance with an alternate embodiment of the present invention.
Figure 6B:
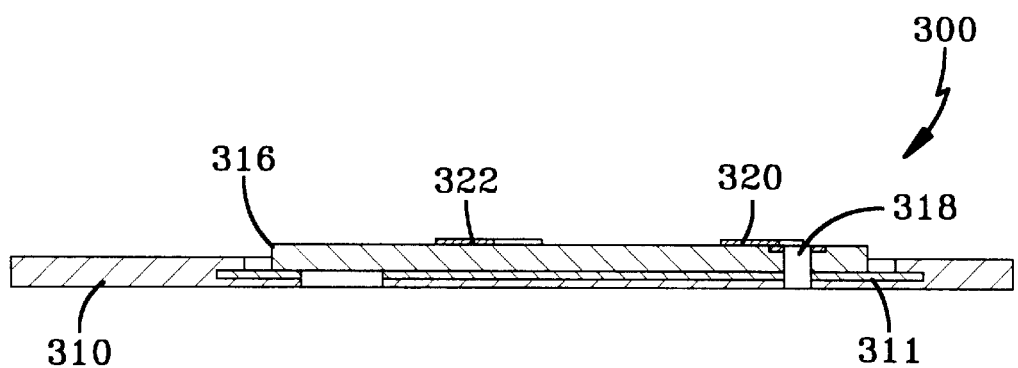

Referring now to FIGS. 6a and 6b, wherein an alternate drain valve 300 in accordance with the present invention includes a body 310 having a port 312 provided therethrough. A movable valve assembly 314 opens and closes access to the port 312. Valve assembly 314 has an arm 316 which pivots about a pivot point 318. Arm 316 is held in place vertically by hold down strips 320, 322. A detent 324 retains the pivot arm in either position. Slots 326 are provided in arm 316 in order to facilitate movement of the pivot arm using a tool.

Operation of the valve 300 is as follows. During operation of the deicer, pivot arm 316 is in the downward position so that port 312 is covered. To drain the deicer of fluids, a tool, such as a screwdriver, is used to pry the pivot arm into the upward position so that port 312 is exposed, thereby allowing fluids to drain out of the deicer.

Figure 7A:
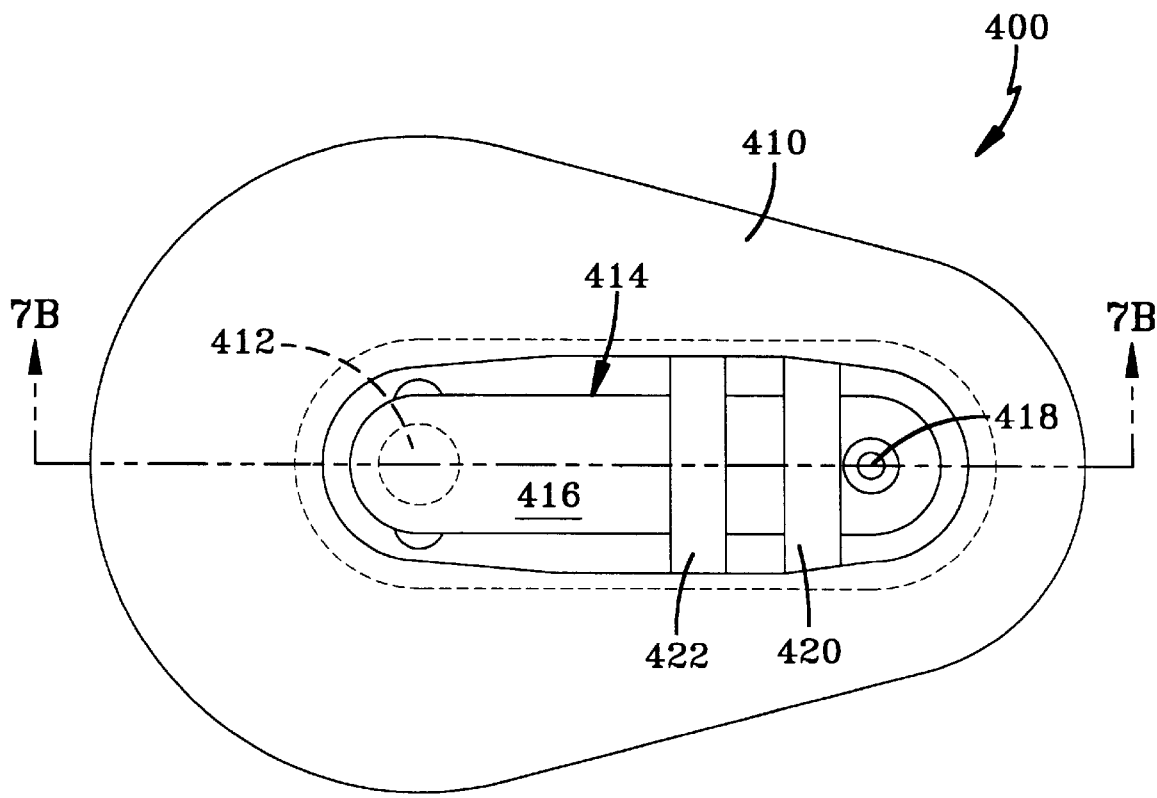
FIG. 7a is a top view of a drain valve in accordance with an alternate embodiment of the present invention.
Figure 7B:
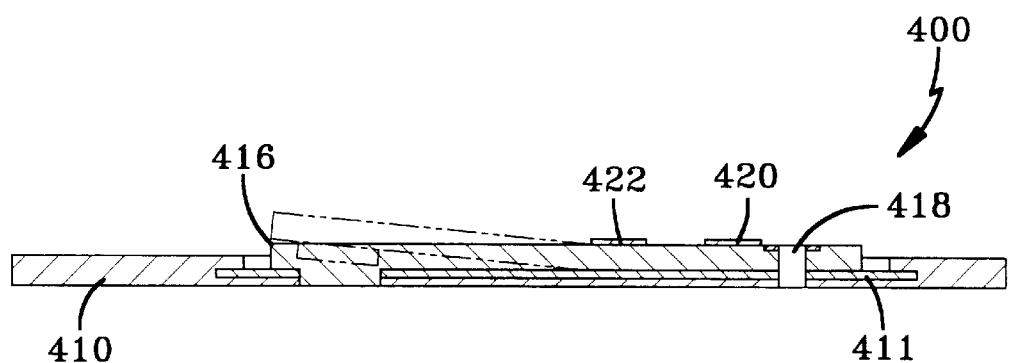

Referring now to FIGS. 7a and 7b, wherein an alternate drain valve 400 in accordance with the present invention includes a body 410 having a port 412 provided therethrough. A movable valve assembly 416 opens and closes access to the port 412. Valve assembly 414 has an arm 416 which springs vertically about a pivot point 418. Arm 416 is held in place vertically by retaining strips 420, 422. Arm 416 is configured such that it provides a snap type connection in port 412. When arm 416 is pushed vertically downward toward port 412, it snaps into port 412 and seals it. A sealing disc 411 provides a seal between arm 416 and body 410.

Operation of the valve 400 is as follows. During operation of the deicer, pivot arm 416 is in the vertically downward position so that port 412 is sealed. To drain the deicer of fluids, a tool, such as a screwdriver, is used to pry the pivot arm upward to snap arm 416 out of the port 412, so that port 412 is exposed, thereby allowing fluids to drain out of the deicer. Valve 400 may also be utilized as a pressure relief valve for the deicer by adjusting the spring tension of arm 416 so that arm 416 is deflected upward under the appropriate amount of deicer internal pressure.

Figure 8:
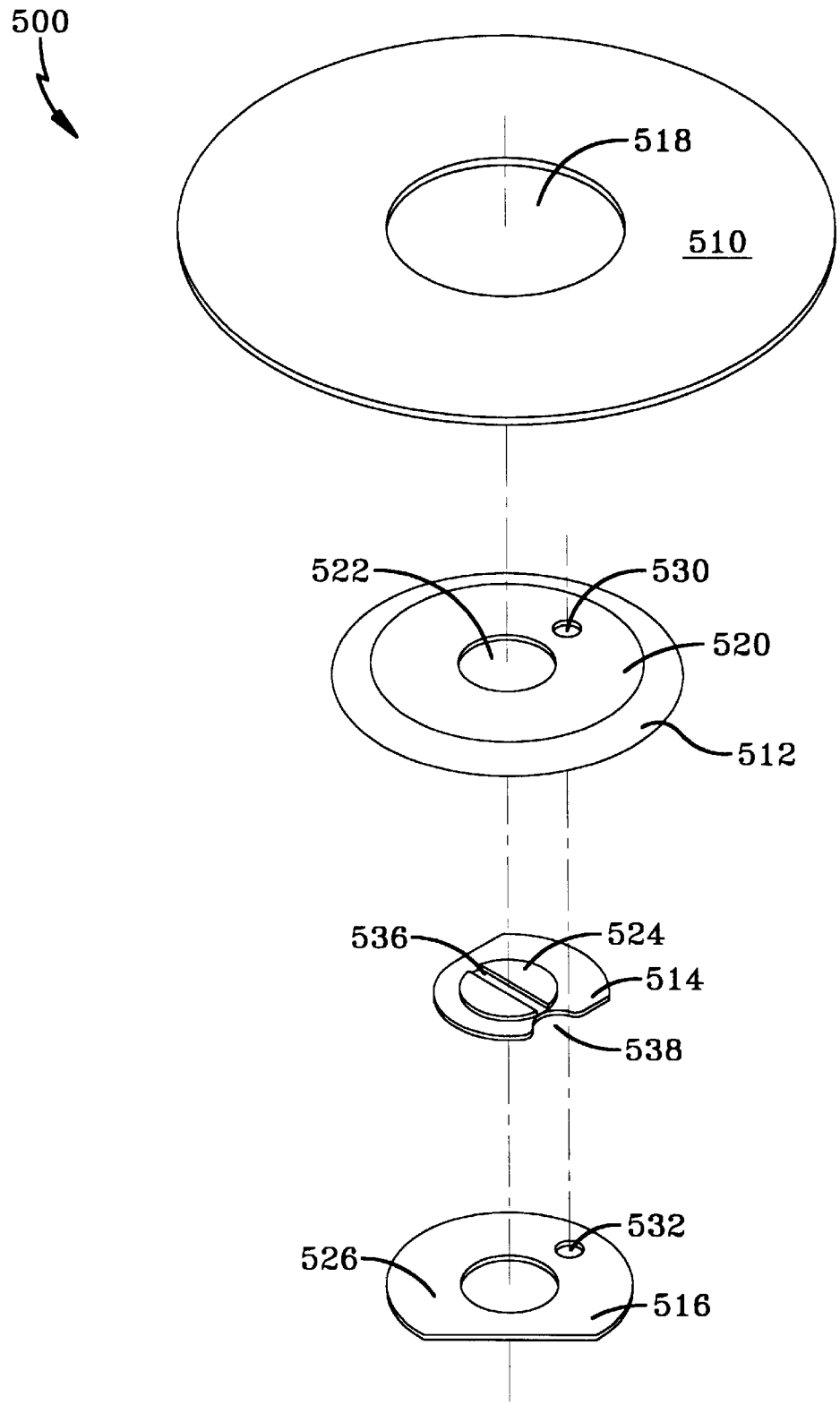
FIG. 8 is an exploded view of a drain valve in accordance with an alternate embodiment of the present invention.

Referring now to FIG. 8, wherein an alternate drain valve 500 in accordance with the present invention includes a disc 510, a top section 512, a gate section 514 and a base section 516. Disc 510 is preferably made of a neoprene coated fabric. Sections 512, 514 and 516 are preferably made of molded epoxy glass. Disc 510 has a hole 518 for receiving the top portion 520 of top section 512. Top section 512 has a hole 522 for receiving the top portion 524 of gate 514. A detent 526 in bottom section 516 receives an embossed portion (not shown) on gate 514. A port hole 530 is provided in top section 512 and a is aligned with a port hole 532 provided in bottom section 516. The port holes provide access to the inside of the inflatable member of the deicer (not shown) for draining thereof. Top section 512 and bottom section 516 are preferably glued together with gate 514 sandwiched therebetween. The glue should not interfere with rotation of gate 514.

Operation of the valve 500 is as follows. During operation of the deicer, gate 514 is positioned so that it blocks and seals port holes 530, 532. To drain the deicer of fluids, a tool, such as a screwdriver, is inserted into a slot 536 provided in gate 514 in order to rotate gate 514 so that a gate detent 538 is aligned with port holes 530, 532, thereby allowing fluids to drain out of the deicer.

Although the invention has been shown and described with exemplary embodiments thereof, it should be understood by those skilled in the art that the foregoing and various other changes, omissions and additions may be made therein and thereto without departing with the spirit and the scope of the invention. For instance, other pneumatic deicer constructions and other drain valve constructions may be utilized.

We claim:

1. An apparatus for removing ice from an airfoil comprising:

a deicer having at least one inflatable member;

an inflation port in said deicer for providing access to said at least one inflatable member from a pressurized fluid source for inflation control of said deicer; and, a drain valve integral with said deicer separate from said inflation port for providing access to said at least one inflatable member for draining fluids from said at least one inflatable member;

wherein said drain valve is closed during said inflation control of said deicer and opened during purging of accumulated fluids from the deicer.

2. An apparatus for removing ice from an airfoil in accordance with claim 1, wherein said drain valve comprises:

a body having a body port provided therethrough; and, a rotatable valve member having a valve port provided therethrough;

whereby said rotatable valve member is rotated to align said body port and said valve port.

3. An apparatus for removing ice from an airfoil in accordance with claim 1, wherein said drain valve comprises:

a body having a body port provided therethrough; and, a valve arm having a plug for sealing said body port;

whereby the drain valve is opened by removing said plug from body port.

4. An apparatus for removing ice from an airfoil in accordance with claim 1, wherein said drain valve comprises:

a body having a body port provided therethrough; and, a plug for sealing said body port;

whereby the drain valve is opened by removing said plug from body port.

5. An apparatus for removing ice from an airfoil in accordance with claim 4, wherein said body port and said plug are threaded.

6. An apparatus for removing ice from an airfoil in accordance with claim 1, wherein said inflatable member comprises:

a bottom layer;

a first intermediate nonstretchable layer;

a second intermediate stretchable layer; and, a top stretchable layer.

7. An apparatus for removing ice from an airfoil in accordance with claim 1, further comprising:

means for providing pressurized fluid from said pressurized fluid source during purging of accumulated fluids from the deicer, such that fluid is drained from the deicer by opening said drain valve and pressurizing the deicer through said inflation port.

8. A method for draining fluid from an apparatus for removing ice from an airfoil comprising the steps of:

providing a deicer having an inflatable member having an inflation port in said deicer for providing access to said inflatable member from a pressurized fluid source for inflation control of said deicer;

providing a drain valve integral with said deicer separate from said inflation port for providing access to said inflatable member for draining of said inflatable member;

opening said drain valve; and purging accumulated fluid from the deicer by providing pressurized fluid from said pressurized fluid source to said inflatable member and draining fluid from the deicer.

* * * * *